United States Patent [19]
LaPlante

[11] Patent Number: 5,374,136
[45] Date of Patent: Dec. 20, 1994

[54] MOUNTING MECHANISM
[75] Inventor: Pierre LaPlante, Newberg, Oreg.
[73] Assignee: A-Dec. Inc., Newberg, Oreg.
[21] Appl. No.: 224,101
[22] Filed: Apr. 6, 1994

Related U.S. Application Data
[63] Continuation of Ser. No. 989,082, Dec. 11, 1992, abandoned.

[51] Int. Cl.⁵ .............................................. F16B 1/00
[52] U.S. Cl. ..................................... 403/370; 403/368; 403/361; 403/362
[58] Field of Search ............................. 248/289.1, 282; 403/370, 369, 368, 375, 263, 65, 68, 83, 84, 103, 104, 118, 119, 121, 146, 147, 161, 165, 166, 164, 361, 362

[56] References Cited
U.S. PATENT DOCUMENTS

| | | | |
|---|---|---|---|
| 2,634,144 | 4/1953 | Friedman | 403/370 |
| 3,250,583 | 5/1966 | Phillips . | |
| 3,656,783 | 4/1972 | Lothar | 403/370 |
| 4,316,678 | 2/1982 | F'Geppert | 403/370 |
| 4,598,443 | 7/1986 | Ostling | 403/370 |
| 4,884,916 | 12/1989 | Johnson, III | 403/370 |
| 4,929,111 | 5/1990 | Lauritano | 403/370 |
| 5,197,345 | 3/1993 | Rose | 403/370 |

OTHER PUBLICATIONS
Marus Dental Products Instruction Manual, pp. II–IV (1979).
Marus Dental Equipment and Accessories Retail Price Catalogue, p. 39 (Spring 1982).
A–Dec Equipment Catalog, p. 42 (Sep. 1991) (Illustrating typical levelling assemblies comprising a levelling collar having horizontal set screws for levelling dental appliances attached to a post that is inserted into the collar).

Primary Examiner—Randolph A. Reese
Assistant Examiner—Anthony Knight
Attorney, Agent, or Firm—Klarquist Sparkman Campbell Leigh & Whinston

[57] ABSTRACT

The bracket (12) is bolted loosely to the attachment arm (14) of a dental chair to establish a preliminary orientation of the bracket relative to the attachment arm. The bracket is then levelled with adjustment screws (40) which bear against a surface on the attachment arm to establish a level orientation. The bolt fastening the bracket to the attachment arm is then tightened to fix the level orientation.

10 Claims, 2 Drawing Sheets

MOUNTING MECHANISM

This application is a continuation of application Ser. No. 07/989,082, filed on Dec. 11, 1992 now abandoned.

TECHNICAL FIELD

This invention relates to a mechanism for mounting a dental appliance utility center to an arm that is attached to a dental chair, and for levelling the utility center.

BACKGROUND INFORMATION

Most dental chairs are modular units capable of being equipped with a variety of dental appliances. When so equipped, the appliances are often mounted to a utility box. The utility box is mounted to a swing arm, or attachment arm, that is connected to the chair. The utility box is mounted to the attachment arm so that the appliances are positioned in close proximity to the dental chair for easy access by the dentist. The attachment arm is connected to the base of the chair in a manner such that the arm may be rotated about the chair to allow the dentist to position the appliances on either side of the chair.

The utility box must be level when it is mounted on the attachment arm so that the box and the appliances remain level when the attachment arm is rotated from one side of the chair to the other. Various methods have been developed for levelling the utility box. Prior methods rely upon a vertical post extending from the bottom of the utility box. The post is fit into a collared sleeve on the attachment arm. Numerous set screws, usually eight, are threaded into the collar perpendicular to the longitudinal axis of the post. These set screws are adjusted to bear against the post until the utility box is level.

It is difficult to level utility boxes with such post-type levelling systems. Not only are the set screws difficult to access for adjustment and levelling of the box, but levelling the box is difficult due to the number of set screws.

SUMMARY OF THE INVENTION

This invention relates to a mechanism for mounting a dental utility box to an attachment arm. The mechanism provides simplified levelling of the utility box and eliminates the need for a vertical post-type levelling adjustment. The mechanism includes a bracket attached to the utility box, and bolted to the attachment arm. The bracket is initially positioned on the attachment arm and loosely bolted in place to establish a preliminary orientation of the utility box relative to the attachment arm. When loosely bolted in this manner, a spring washer holds the bracket in place, yet allows for limited motion of the bracket for levelling.

The utility box is levelled by adjusting three levelling screws that extend through the base of the bracket around the bolt. The screws are adjusted such that they bear against a surface on the attachment arm, thereby altering the orientation of the utility box relative to the attachment arm. The screws are adjusted until the utility box is level.

The bolt is tightened when the box is level. This fixes the bracket in a level orientation. Rotation of the attachment arm around the base of the chair does not change this fixed, level orientation of the utility box relative to the arm.

DESCRIPTION OF THE PREFERRED EMBODIMENTS

Figure 1:
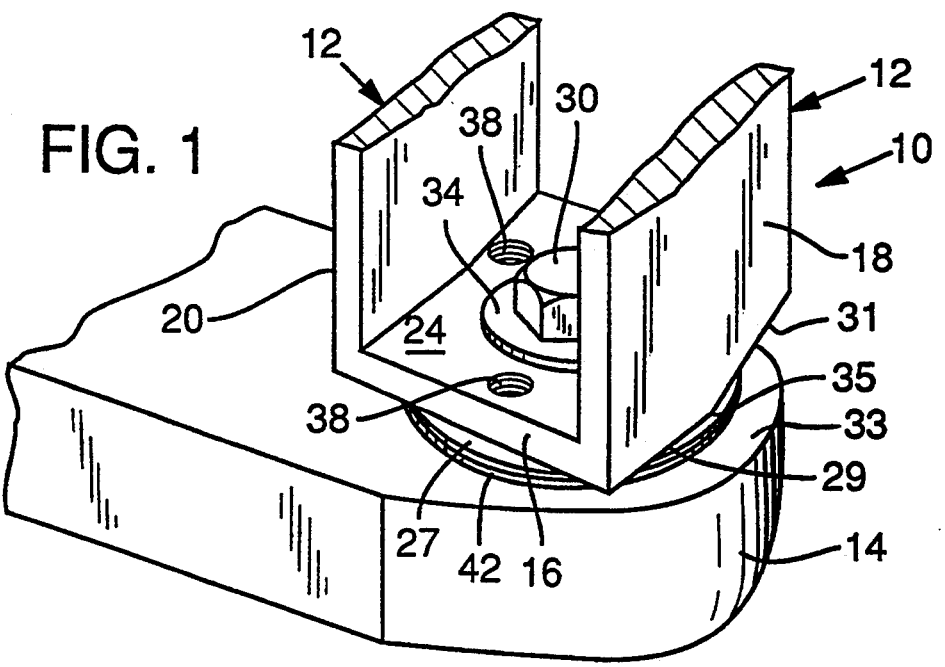
FIG. 1 is a perspective view of one embodiment of the mounting mechanism of the present invention, showing a bracket attached to a utility box, and to an attachment arm.

FIGS. 1, 2, 3 and 4 show one embodiment of a mounting mechanism 10 formed in accordance with the present invention. The mechanism includes a bracket 12 that is mounted to an attachment arm 14. Attachment arm 14 is mounted to the base of a dental chair (not shown) in a conventional manner so that the attachment arm may be rotated from one side of the chair to the other. Bracket 12 includes a base 16, and two opposite upright frame members 18 and 20. Frame members 18 and 20 serve as the attachment supports for various dental appliances such as a cuspidor, light mounting structures, bearing hubs for control units and dental handpiece holders, etc. (none of which are shown). These appliances and their mounting structures are collectively referred to as the utility box.

Figure 2:
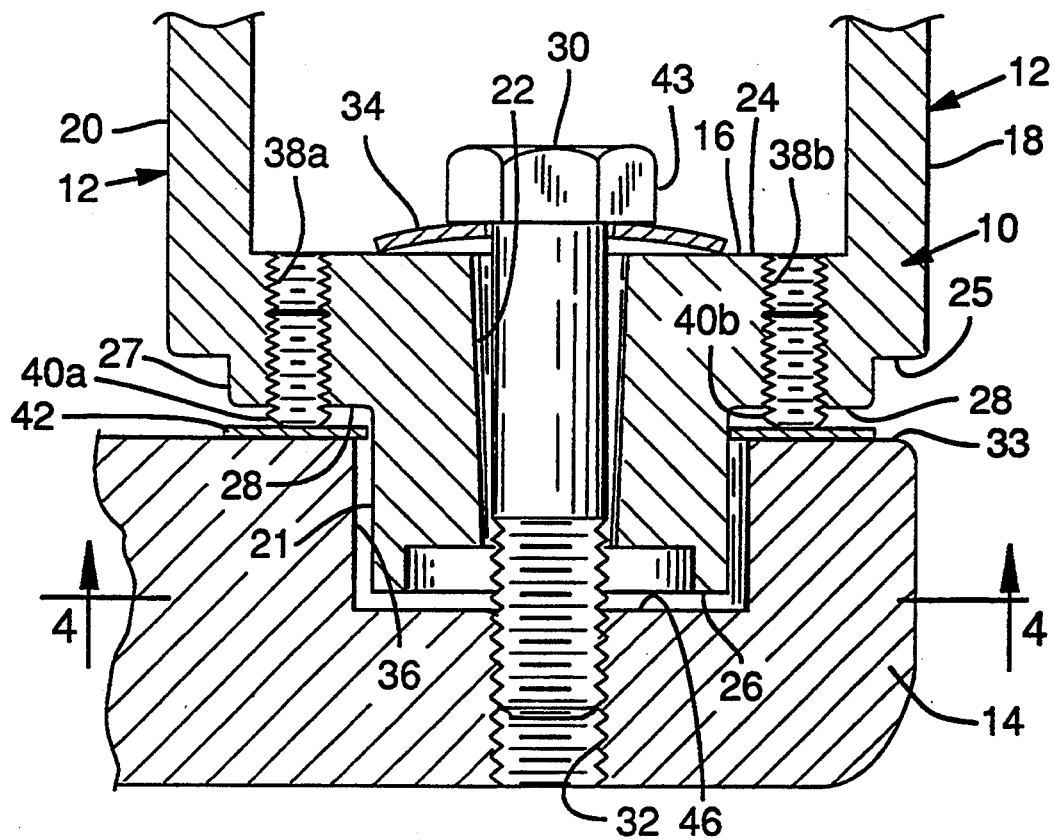
FIG. 2 is a cross-sectional view, taken along the line 2—2 of FIG. 4.

Bracket 12 and attachment arm 14 are shown in cross-section in FIG. 2. Downwardly extended portion 21 extends from the lower side of base 16. Extended portion 21 is cylindrical in the preferred embodiment, but may be formed in any number of shapes. A bore 22 is formed through the center of base 16, and extends completely through extended portion 21. Bore 22 tapers from larger to smaller in the direction from upper surface 24 of base 16 to lower surface 26 of extended portion 21. The taper in the bore facilitates casting of bracket 12 and, as explained below, allows for limited motion of bracket 12 when the bracket is loosely mounted to attachment arm 14.

Figure 3:
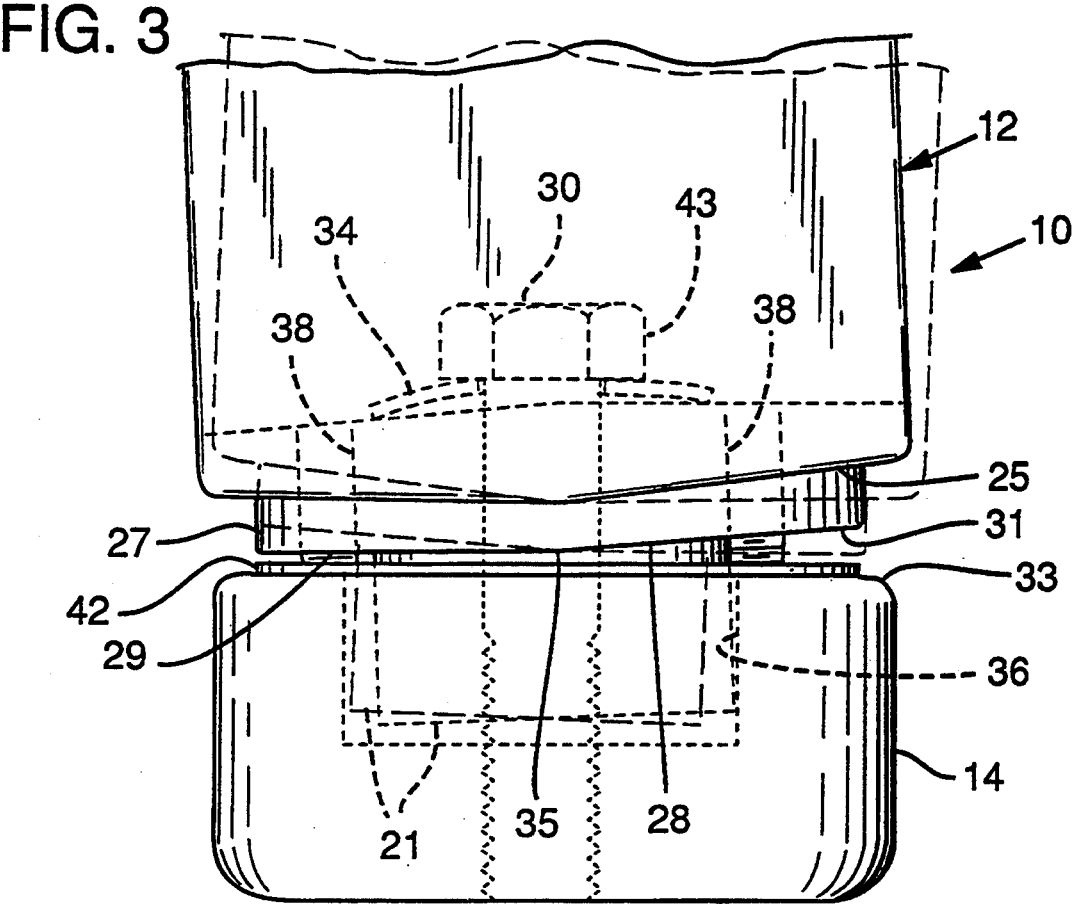
FIG. 3 is a side view of the mechanism of FIG. 1.

An annular shoulder 27 is formed to protrude from the underside 25 of base 16 and surround the extended portion 21. As seen in FIG. 3, the lower side 28 of the shoulder 27 comprises two planar surfaces 29, 31, that intersect at a linear ridge 35. The angled surfaces 29, 31 slope upwardly from the ridge 35 so that the ridge 35 defines the lowermost projection of the shoulder undersurface.

A bore 36 is formed in attachment arm 14. The diameter of bore 36 is slightly larger than the diameter of extended portion 21, and bore 36 is slightly deeper than the length that extended portion 21 extends from the lower side 28 of shoulder 27. A threaded hole 32 is formed in the arm 14 concentric with, and extending downwardly from the bottom surface 46 of the bore 36.

A bolt 30 is provided for fastening bracket 12 to attachment arm 14. Bolt 30 is long enough to extend completely through bore 22 and thread into a threaded hole 32 in attachment arm 14. A standard spring washer 34 is used with bolt 30. The function of spring washer 34 is explained below.

Figure 4:
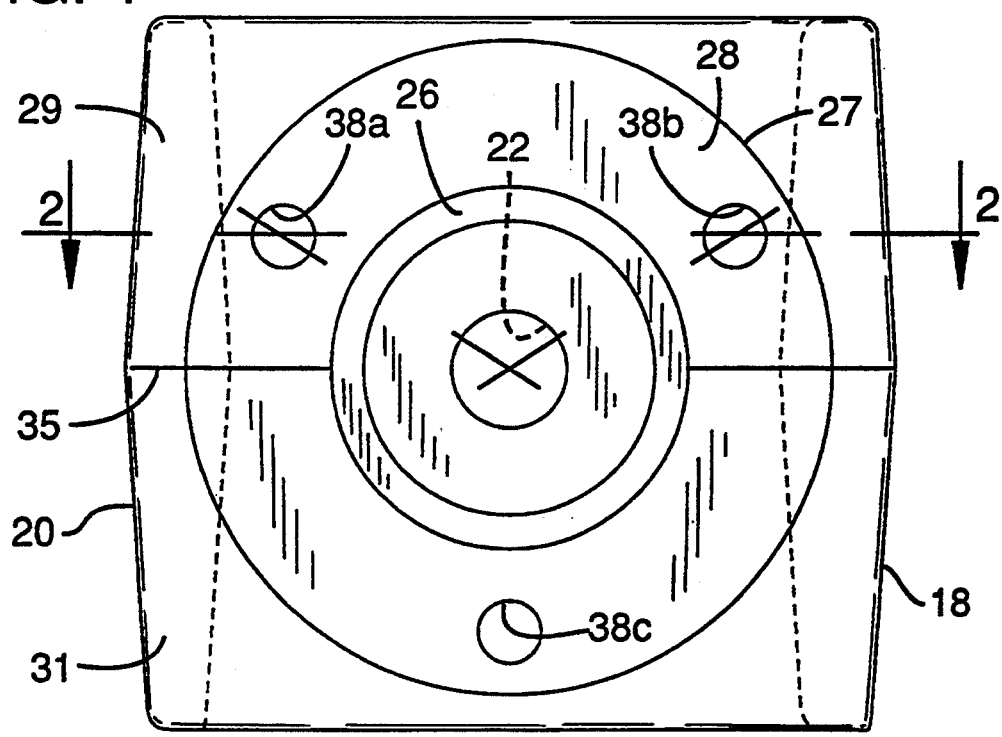
FIG. 4 is a view taken along the line 4—4 of FIG. 2.

As seen in FIG. 4, a plurality of threaded openings 38 are formed through base 16, along axes that are parallel to the longitudinal axis through bore 22. Thus, each threaded opening 38a, 38b and 38c extends completely through lower side 28 of shoulder 27. Threaded openings 38a, 38b and 38c are evenly spaced around the periphery of bore 22, outside of the of spring washer 34.

An adjusting or levelling screw 40 is threaded into each threaded opening 38. Thus, as seen in FIG. 2, the adjusting screws 40a and 40b, threaded into threaded opening 38a and 38b repsectively, protrude from the lower side 28. Adjusting screws 40 are standard set screws with hex, or allen-type sockets. Three threaded openings 38 and corresponding adjusting screws 40 are preferred, although the number is not critical.

An annular thrust washer 42 is positioned around extended portion 21, to underlime the lower side 28 of shoulder 27. Washer 42 provides a bearing surface for the set screws 40, and is preferably made of brass, but may be made of other materials.

Bracket 12 is mounted to attachment arm 14 by inserting extended portion 21 into bore 36 such that bore 22 is aligned with threaded opening 32. Bolt 30 is inserted through bore 22, and is threaded into threaded opening 32 just until the head 42 of the bolt contacts the spring washer 34. There is a gap between the lower side 26 of extended portion 21 and the bottom surface 46 of bore 36 because the length of extended portion 21 is less than the depth of bore 36. With bracket 12 positioned such that extended portion 21 is received in bore 36, lower side 28 rests on washer 42 (FIG. 3).

With bolt 30 loosely threaded into attachment arm 14, a preliminary levelling orientation of bracket 12 relative to attachment arm 14 is established. Because bolt 30 is not completely tightened to attachment arm 14, the position of bracket 12 relative to attachment arm 14 may be adjusted through a limited range of motion to establish the desired, level orientation as described below. Spring washer 34 deflects to allow movement of bracket 12 through this limited range of motion. The tapered bore 22 provides clearance for the limited range of motion of bracket 12 about the stationary bolt 30. Similarly, the slightly greater diameter of bore 36 relative to that of protrusion 21 provides clearance for movement of the extended portion 21. The loosely connected bracket 12 may therefore, move in any direction relative to arm 14.

The utility box generally is not level when bracket 12 is in the preliminary, loosely-connected orientation. However, the limited range of motion allows the orientation of utility box relative to the attachment arm to be adjusted until the box is level. Thus, with bracket 12 in this preliminary orientation, adjustment screws 40 are threaded toward attachment arm 14 until the bear against washer 42. Screws 40 are selectively threaded to extend from the shoulder 27 (against washer 42) by an amount suitable to adjust the position of bracket 12 so that the utility box and dental appliances mounted to it are level.

The desired orientation of bracket 12 relative to attachment arm 14 is the position where the utility box and the appliances mounted to it are level. When bracket 12 is so-adjusted, bolt 30 is tightened completely, deflecting spring washer 40 downwardly so that it is essentially flat. Tightening bolt 30 fixes the position of bracket 12 relative to adjustment arm 14, and thus fixes the established orientation of the bracket relative to the attachment arm.

With bolt 30 tightened, bracket 12 will not move out the established orientation of the bracket relative to the attachment arm. Thus, when the utility box is level it will remain level as attachment arm 14 is rotated from one side of the chair to the other. It will be appreciated that the planar orientation of the attachment arm surface 33 is unchanged during such rotation.

In an alternative embodiment, bracket 12 may be formed without extended portion 21. In this case, bore 36 may be eliminated from attachment arm 14, although a threaded opening 32 must be present for receiving bolt 30.

While the present invention has been described in accordance with preferred embodiments, it is to be understood that certain substitutions and alterations may be made thereto without departing from the spirit and scope of the claims.

I claim:

1. A mechanism for mounting a member to a surface in any of a plurality of orientations relative to the surface, comprising:

a bracket attachable to the member;

fastening means for securing the bracket to the surface and permitting movement of the bracket through a limited range of angular motion, the fastening means including a bolt extending through a bore formed in the bracket, the diameter of the bore being greater than the diameter of the bolt, and wherein the diameter of the bore decreases in the direction from the bracket toward the surface;

adjustment members mounted to the bracket and movable to extend therefrom to bear against the surface, thereby establishing an orientation of the bracket relative to an axis that is perpendicular to the surface; and lock means to fix the orientation of the bracket relative to the surface to prevent movement of the bracket out of the established orientation.

2. The mechanism according to claim 1, wherein the adjustment members comprise a plurality of adjusting screws threaded through the bracket parallel to the longitudinal axis of the bolt.

3. The mechanism according to claim 1, including a plurality of adjustment members.

4. The mechanism according to claim 1, wherein the adjustment members may be moved so that they bear against the surface levels the member.

5. The mechanism according to claim 1, wherein the adjustment members are positioned around the periphery of the bolt.

6. The mechanism according to claim 1, including a second bore formed in the surface for receiving the bracket.

7. A mechanism for mounting a member to a surface in any of a plurality of angular orientations relative to the surface, comprising:

a bracket attachable to the member;

a bolt extending through a bore formed in the bracket, and threaded into the surface for securing the bracket to the surface in a first angular orientation of the bracket relative to an axis that is perpendicular to the surface;

adjustment members mounted to the bracket and movable to extend therefrom to bear against the surface, the movement of the adjustment members being adjustable to adjustably establish a second angular orientation of the bracket relative to the surface; and lock means to fix the bracket in the second angular orientation and to prevent movement of the bracket out of the second angular orientation.

8. The mechanism according to claim 7, wherein the bracket in the first angular orientation is movable through a limited range of angular motion.

9. The mechanism according to claim 7, wherein the member is substantially level when the bracket is in the second angular orientation.

10. The mechanism according to claim 7, including a spring washer on the bolt, the bracket engaging the spring washer while moving through a limited range of motion.

* * * * *